United States Patent
Morishita et al.

(10) Patent No.: US 11,040,882 B2
(45) Date of Patent: Jun. 22, 2021

(54) CARBON MATERIAL PRECURSOR, CARBON MATERIAL PRECURSOR COMPOSITION CONTAINING THE SAME, AND METHOD FOR PRODUCING CARBON MATERIAL USING THESE

(71) Applicant: KABUSHIKI KAISHA TOYOTA CHUO KENKYUSHO, Nagakute (JP)

(72) Inventors: Takuya Morishita, Nagakute (JP); Kazuhiro Nomura, Nagakute (JP); Hiromitsu Tanaka, Nagakute (JP); Megumi Sasaki, Nagakute (JP); Makoto Kato, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 34 days.

(21) Appl. No.: 16/353,324

(22) Filed: Mar. 14, 2019

(65) Prior Publication Data
US 2019/0292056 A1    Sep. 26, 2019

(30) Foreign Application Priority Data

Mar. 23, 2018 (JP) .............................. JP2018-056558
May 25, 2018 (JP) .............................. JP2018-100899

(51) Int. Cl.
| | | |
|---|---|---|
| *C01B 32/05* | (2017.01) | |
| *C08F 20/56* | (2006.01) | |
| *C08K 3/32* | (2006.01) | |
| *D01F 9/21* | (2006.01) | |
| *D01F 9/22* | (2006.01) | |
| *C08K 3/38* | (2006.01) | |

(52) U.S. Cl.
CPC .............. *C01B 32/05* (2017.08); *C08F 20/56* (2013.01); *C08K 3/32* (2013.01); *C08K 3/38* (2013.01); *D01F 9/21* (2013.01); *D01F 9/225* (2013.01); *C08K 2003/322* (2013.01); *C08K 2003/329* (2013.01)

(58) Field of Classification Search
CPC .......... C08F 20/56; C08F 120/56; D01F 9/21; C01B 32/05; C08K 3/24; C08J 2333/26
USPC ..................................................... 524/501
See application file for complete search history.

(56) References Cited

U.S. PATENT DOCUMENTS

| | | | | |
|---|---|---|---|---|
| 3,723,609 A | * | 3/1973 | Mansmann | D01F 9/21 423/447.1 |
| 6,706,162 B1 | * | 3/2004 | Voss | B01D 53/02 204/455 |
| 7,026,414 B1 | * | 4/2006 | Barron | C08F 6/04 525/418 |

FOREIGN PATENT DOCUMENTS

| | | |
|---|---|---|
| JP | 37-4405 | 6/1962 |
| JP | 2007-269968 A | 10/2007 |
| JP | 2015-74844 A | 4/2015 |
| JP | 2016-40419 A | 3/2016 |
| JP | 2016-113726 A | 6/2016 |
| WO | 2015/008626 A1 | 1/2015 |

OTHER PUBLICATIONS

Nov. 9, 2020 Office Action issued in Japanese Patent Application No. 2018-100899.

\* cited by examiner

*Primary Examiner* — Doris L Lee
(74) *Attorney, Agent, or Firm* — Oliff PLC

(57) ABSTRACT

A carbon material precursor comprises an acrylamide-based polymer having a weight-average molecular weight of 10,000 to 2,000,000 and a polydispersity of the molecular weight (weight-average molecular weight/number-average molecular weight) of 5.0 or less.

4 Claims, No Drawings

CARBON MATERIAL PRECURSOR, CARBON MATERIAL PRECURSOR COMPOSITION CONTAINING THE SAME, AND METHOD FOR PRODUCING CARBON MATERIAL USING THESE

BACKGROUND OF THE INVENTION

Field of the Invention

The present invention relates to a carbon material precursor, a carbon material precursor composition containing the same, and a method for producing a carbon material using these.

Related Background Art

As a conventional method for producing a carbon fiber, which is a type of carbon material, a method including thermally-stabilizing (flameproofing) a carbon fiber precursor, which is obtained by spinning polyacrylonitrile, and then carbonizing the carbon fiber precursor has mainly been employed (for example, Japanese Examined Patent Application Publication No. 37-4405 (PTL 1), Japanese Unexamined Patent Application Publication No. 2015-74844 (PTL 2), Japanese Unexamined Patent Application Publication No. 2016-40419 (PTL 3), and Japanese Unexamined Patent Application Publication No. 2016-113726 (PTL 4)). Since polyacrylonitrile, which is used in this method, is unlikely to be dissolved in an inexpensive general purpose solvent, it is necessary to use an expensive solvent such as dimethyl sulfoxide or N,N-dimethylacetamide in polymerization and spinning, which brings about a problem of high production costs of carbon fibers.

By contrast, polyacrylamide is a water-soluble polymer, and water, which is inexpensive and has a small environmental load, can be used as a solvent in polymerization and forming processes (forming into films, forming into sheets, spinning, and the like). Hence, polyacrylamide is expected to reduce the production costs of carbon materials.

SUMMARY OF THE INVENTION

However, the present inventors found that there is a problem that the mass of a carbon material precursor prepared using a generally-used polyacrylamide is greatly reduced by the thermally-stabilizing treatment and the carbonizing treatment, resulting in low thermal-stabilization yield and carbonization yield.

The present invention has been made in view of the above-described problems of the conventional technique, and an object thereof is to provide a carbon material precursor formed of an acrylamide-based polymer and having a high thermal-stabilization yield and a high carbonization yield, a carbon material precursor composition containing the carbon material precursor, and a method for producing a carbon material using these.

The present inventors conducted earnest studies to achieve the above-described object, and as a result found that in a carbon material precursor formed of an acrylamide-based polymer, using an acrylamide-based polymer having a low polydispersity of the molecular weight improves the thermal-stabilization yield and the carbonization yield, and completed the present invention.

Specifically, a carbon material precursor of the present invention comprises an acrylamide-based polymer having a weight-average molecular weight of 10,000 to 2,000,000 and having a polydispersity of the molecular weight (weight-average molecular weight/number-average molecular weight) of 5.0 or less. In addition, a carbon material precursor composition of the present invention comprises: the carbon material precursor of the present invention; and at least one addition component selected from the group consisting of acids and salts thereof. Moreover, a method for producing a carbon material of the present invention comprises: performing a thermally-stabilizing treatment on the carbon material precursor of the present invention or the carbon material precursor composition of the present invention; and then performing carbonizing treatment thereon.

Note that although it is not necessarily certain why the carbon material precursor of the present invention has a high thermal-stabilization yield and a high carbonization yield, the present inventors has surmised as described below. Specifically, the carbon material precursor of the present invention is formed of an acrylamide-based polymer having a low polydispersity of the molecular weight. It is surmised that since such an acrylamide-based polymer having a low polydispersity of the molecular weight has a low content of an acrylamide-based polymer having a low molecular weight which has a low resistance to thermal decomposition in the presence of oxygen (for example, in the air), such an acrylamide-based polymer is unlikely to be thermally decomposed even when subjected to heating treatment (thermally-stabilizing treatment) under an oxygen atmosphere; accordingly, a large amount of thermally-stabilized product is generated (the thermal-stabilization yield of a carbon material precursor is high). It has also been surmised that conducting the thermally-stabilizing treatment causes an imide ring structure having a high heat resistance to be formed by deammoniation reaction and dehydration reaction, and causes an unsaturated bond to be formed by dehydration reaction and the like after partial oxidation reaction and the like, in the molecule of the acrylamide-based polymer, which makes the generated thermally-stabilized product as well unlikely to be thermally decomposed in the thermally-stabilizing treatment, leading to a high thermal-stabilization yield of a carbon material precursor. Moreover, it has been surmised that due to its excellent heat resistance, the generated thermally-stabilized product is unlikely to be thermally decomposed even when subjected to heating treatment (carbonizing treatment) under an inert gas atmosphere, so that a large amount of a carbon material is generated (the carbonization yield of the thermally-stabilized product is high). Furthermore, it has been surmised that in the carbon material precursor composition of the present invention, since the acid and salts thereof, which are addition components, greatly promote deammoniation reaction and dehydration reaction of the acrylamide-based polymer, an imide ring structure and an unsaturated bond having a high heat resistance are likely to be formed in the molecule of the acrylamide-based polymer, which make the generated thermally-stabilized product further unlikely to be thermally decomposed in the thermally-stabilizing treatment, so that the thermal-stabilization yield of the carbon material precursor becomes much higher. In addition, it has been surmised that due to its further excellent heat resistance, the generated thermally-stabilized product is further unlikely to be thermally decomposed even when subjected to carbonizing treatment, so that a much larger amount of a carbon material is generated (the carbonization yield of the thermally-stabilized product becomes much higher).

On the other hand, it is surmised as follows: a general acrylamide-based polymer has a wide range of distribution of molecular weights and has a high polydispersity of the molecular weights. This is because such an acrylamide-based polymer contains a large amount of low molecular weight polymers (for example, polymers having a weight-average molecular weight of 8000 or less, and particularly 5000 or less) and a large amount of high molecular weight polymers. When thermally-stabilizing treatment is performed on a carbon material precursor formed of such an acrylamide-based polymer containing a large amount of low molecular weight polymers, the low molecular weight polymers are thermally decomposed. In addition, since heat generated by the thermal decomposition also causes the high molecular weight polymers to be thermally decomposed, the amount of a thermally-stabilized product generated becomes small (the thermal-stabilization yield of the carbon material precursor is low). In addition, when a large amount of high molecular weight polymers are contained in an acrylamide-based polymer, the number of entanglements of polymer chains and the number of hydrogen bonds between polymer chains are large, so that the number of pseudo cross-linking structures is also large. It has been surmised that for the above reason, the molecules of the polymer are not intra-molecularly cyclized by the heating treatment, so that cyclic structures (imide ring structures) and unsaturated bonds having a high heat resistance are unlikely to be formed, resulting in a low thermal-stabilization yield of the carbon material precursor and a low carbonization yield of the thermally-stabilized product.

According to the present invention, it is possible to obtain a carbon material precursor formed of an acrylamide-based polymer and having a high thermal-stabilization yield and a high carbonization yield. In addition, using such a carbon material precursor of the present invention makes it possible to efficiently produce a carbon material.

DETAILED DESCRIPTION OF THE PREFERRED EMBODIMENTS

Hereinafter, the present invention is described in detail with reference to a preferred embodiment of the present invention.

[Carbon Material Precursor]

First, a carbon material precursor of the present invention is described. The carbon material precursor of the present invention is formed of an acrylamide-based polymer having a weight-average molecular weight of 10,000 to 2,000,000 and a polydispersity of the molecular weight (weight-average molecular weight/number-average molecular weight) of 5.0 or less.

(Acrylamide-Based Polymer)

The weight-average molecular weight of the acrylamide-based polymer used in the present invention is 10,000 to 2,000,000. If the weight-average molecular weight of the acrylamide-based polymer is more than the upper limit, the forming processability (spinnability) in forming into films, forming into sheets, spinning, and the like decreases. On the other hand, if the weight-average molecular weight of the acrylamide-based polymer is less than the lower limit, the strength of the carbon material precursor formed of the acrylamide-based polymer decreases. Moreover, the upper limit for the weight-average molecular weight of the acrylamide-based polymer is preferably 1,500,000 or less, more preferably 1,000,000 or less, further preferably 800,000 or less, still further preferably 500,000 or less, particularly preferably 300,000 or less, and most preferably 200,000 or less, from the viewpoint that the forming processability (spinnability) is further improved. In addition, the lower limit for the weight-average molecular weight of the acrylamide-based polymer is preferably 20,000 or more, and more preferably 30,000 or more, from the viewpoint that the strength of the carbon material precursor formed of the acrylamide-based polymer is further improved.

In addition, the polydispersity of the molecular weight (weight-average molecular weight/number-average molecular weight) of the acrylamide-based polymer used in the present invention is 5.0 or less. If the polydispersity of the molecular weight of the acrylamide-based polymer is more than the upper limit, the thermal stability in the presence of oxygen (for example, in the air) is low and the thermal-stabilization yield and the carbonization yield decrease. Moreover, the upper limit for the polydispersity of the molecular weight of the acrylamide-based polymer is preferably 4.0 or less, more preferably 3.5 or less, further preferably 3.0 or less, still further preferably 2.8 or less, particularly preferably 2.5 or less, and most preferably 2.3 or less, from the viewpoint that the thermal stability in the presence of oxygen is improved and the thermal-stabilization yield and the carbonization yield become higher. In addition, the lower limit for the polydispersity of the molecular weight of the acrylamide-based polymer is not particularly limited as long as the lower limit is 1.0 or more; however, the lower limit is preferably 1.05 or more, more preferably 1.1 or more, further preferably 1.2 or more, particularly preferably 1.3 or more, and most preferably 1.5 or more, from the viewpoint that the forming processability (spinnability) is improved.

Note that in the present invention, the weight-average molecular weight, the number-average molecular weight, and the polydispersity of the molecular weight of the acrylamide-based polymer are determined using gel permeation chromatography.

Moreover, the acrylamide-based polymer used in the present invention is preferably soluble in at least one of aqueous solvents (water, alcohols, and the like, and mixed solvents of these) and water-based mixture solvents (mixed solvents of the aqueous solvent and an organic solvent (tetrahydrofuran and the like)). This makes it possible to employ dry forming (dry spinning), dry-wet forming (dry-wet spinning), wet forming (wet spinning), or electrospinning using the aqueous solvent or the water-based mixture solvent for forming a carbon material precursor, and thus makes it possible to produce a carbon material safely at low costs. In addition, when a carbon material precursor composition, which is described later, is produced, this makes it possible to employ wet mixing using the aqueous solvent or the water-based mixture solvent and thus makes it possible to mix the acrylamide-based polymer and an addition component, which is described later, uniformly and safely at low costs. Moreover, when the obtained carbon material precursor composition is formed, this makes it possible to employ dry forming (dry spinning), dry-wet forming (dry-wet spinning), wet forming (wet spinning), or electrospinning using the aqueous solvent or the water-based mixture solvent and thus makes it possible to produce a carbon material safely at low costs. Note that the content of the organic solvent in the water-based mixture solvent is not particularly limited as long as the amount allows an acrylamide-based polymer that is insoluble or poorly soluble in the aqueous solvent to be dissolved by mixing the organic solvent. In addition, among such acrylamide-based polymers, an acrylamide-based polymer that is soluble in the aqueous solvent is preferable, and an acrylamide-based polymer that is soluble in water (water-soluble) is more preferable, from the viewpoint that this makes it possible to produce a carbon material precursor composition and a carbon material more safely at lower costs.

Such an acrylamide-based polymer may be a homopolymer of an acrylamide-based monomer or may be a copolymer of an acrylamide-based monomer and another polymerizable monomer, but is preferably a copolymer of an acrylamide-based monomer and another polymerizable monomer, from the viewpoint that the thermal-stabilization yield and the carbonization yield of the carbon material precursor are improved.

The lower limit for the content of the acrylamide-based monomer unit in the copolymer of the acrylamide-based monomer and the other polymerizable monomer is preferably 50 mol % or more, more preferably 60 mol % or more, and particularly preferably 70 mol % or more, from the viewpoint of the solubility of the copolymer into the aqueous solvent or the water-based mixture solvent. In addition, the upper limit for the content of the acrylamide-based monomer unit is preferably 99.9 mol % or less, more preferably 99 mol % or less, further preferably 95 mol % or less, particularly preferably 90 mol % or less, and most preferably 85 mol % or less, from the viewpoint that the thermal-stabilization yield and the carbonization yield of the carbon material precursor are improved.

The lower limit for the content of the other polymerizable monomer unit in the copolymer of the acrylamide-based monomer and the other polymerizable monomer is preferably 0.1 mol % or more, more preferably 1 mol % or more, further preferably 5 mol % or more, particularly preferably 10 mol % or more, and most preferably 15 mol % or more, from the viewpoint that the thermal-stabilization yield and the carbonization yield of the carbon material precursor are improved. In addition, the upper limit for the content of the other polymerizable monomer unit is preferably 50 mol % or less, more preferably 40 mol % or less, and particularly preferably 30 mol % or less, from the viewpoint of the solubility of the copolymer into the aqueous solvent or the water-based mixture solvent.

The acrylamide-based monomer includes, for example, acrylamide; N-alkylacrylamides such as N-methylacrylamide, N-ethylacrylamide, N-n-propylacrylamide, N-isopropylacrylamide, N-n-butylacrylamide, and N-tert-butylacrylamide; N-cycloalkylacrylamides such as N-cyclohexylacrylamide; dialkylacrylamides such as N,N-dimethylacrylamide; dialkylaminoalkyl acrylamide such as dimethylaminoethyl acrylamide and dimethylaminopropyl acrylamide; hydroxyalkylacrylamides such as N-(hydroxymethyl)acrylamide and N-(hydroxyethyl)acrylamide; N-arylacrylamides such as N-phenylacrylamide; diacetone acrylamide; N,N'-alkylene bisacrylamide such as N,N'-methylene bisacrylamide; methacrylamide; N-alkyl methacrylamides such as N-methyl methacrylamide, N-ethyl methacrylamide, N-n-propyl methacrylamide, N-isopropyl methacrylamide, N-n-butyl methacrylamide, and N-tert-butyl methacrylamide; N-cycloalkyl methacrylamides such as N-cyclohexyl methacrylamide; dialkyl methacrylamides such as N,N-dimethyl methacrylamide; dialkylaminoalkyl methacrylamides such as dimethylaminoethyl methacrylamide and dimethylaminopropyl methacrylamide; hydroxyalkyl methacrylamides such as N-(hydroxymethyl)methacrylamide and N-(hydroxyethyl)methacrylamide; N-arylmethacrylamide such as N-phenylmethacrylamide; diacetone methacrylamide; and N,N'-alkylene bismethacrylamide such as N,N'-methylene bismethacrylamide. One of these acrylamide-based monomers may be used solely or two or more of these may be used in combination. In addition, among these acrylamide-based monomers, acrylamide, N-alkylacrylamide, dialkylacrylamide, methacrylamide, N-alkyl methacrylamide, and dialkyl methacrylamide are preferable, and acrylamide is particularly preferable, from the viewpoint that these acrylamide-based monomers have high solubilities into the aqueous solvent or the water-based mixture solvent.

The other polymerizable monomer includes, for example, vinyl cyanide-based monomers, unsaturated carboxylic acid and salts thereof, unsaturated carboxylic acid anhydride, unsaturated carboxylic acid esters, vinyl-based monomers, and olefin-based monomers. The vinyl cyanide-based monomers include acrylonitrile, methacrylonitrile, 2-hydroxyethylacrylonitrile, chloroacrylonitrile, chloromethacrylonitrile, methoxyacrylonitrile, methoxymethacrylonitrile, and the like. The unsaturated carboxylic acids include acrylic acid, methacrylic acid, itaconic acid, and the like. The unsaturated carboxylic acid anhydrides include maleic anhydride, itaconic anhydride, and the like. The unsaturated carboxylic acid esters include methyl acrylate, methyl methacrylate, and the like. The vinyl-based monomers include styrene, α-methylstyrene, vinyl chloride, vinyl alcohol, and the like. The olefin-based monomers include ethylene, propylene, and the like. One of these other polymerizable monomers may be used solely or two or more of these may be used in combination. In addition, among these other polymerizable monomers, vinyl cyanide-based monomers are preferable, and acrylonitrile is particularly preferable, from the viewpoint that the forming processability (spinnability), the thermal-stabilization yield, and the carbonization yield of the carbon material precursor are improved.

As the method for producing such a carbon material precursor of the present invention, a method may be employed in which a publicly-known polymerization reaction such as radical polymerization, cationic polymerization, anionic polymerization, or living radical polymerization is performed by a polymerization method such as solution polymerization, suspension polymerization, precipitation polymerization, dispersion polymerization, or emulsion polymerization (for example, inverse emulsion polymerization). Among the above-described polymerization reactions, the radical polymerization is preferable from the viewpoint that this makes it possible to reduce the polydispersity of the molecular weight of the obtained acrylamide-based polymer and improve the thermal-stabilization yield and the carbonization yield, and also makes it possible to produce a carbon material precursor at low costs. In addition, in a case of employing the solution polymerization, as the solvent, one in which monomers of raw materials and an obtained acrylamide-based polymer can be dissolved is preferably used. The aqueous solvent (water, alcohols, and the like, and mixed solvents of these, and the like) or the water-based mixture solvent (a mixed solvent of the aqueous solvent and the organic solvent (tetrahydrofuran and the like)) is more preferably used, the aqueous solvent is particularly preferably used, and water is most preferably used, from the viewpoint that it allows the production safely at low costs.

In the radical polymerization, as a polymerization initiator, a conventionally publicly-known radical polymerization initiator such as azobisisobutyronitrile, benzoyl peroxide, 4,4'-azobis(4-cyanovaleric acid), ammonium persulfate, and potassium persulfate may be used. However, in a case where the aqueous solvent or the water-based mixture solvent is used as the solvent, a radical polymerization initiator that is soluble in the aqueous solvent or the water-based mixture solvent (preferably the aqueous solvent, and more preferably water) such as 4,4'-azobis(4-cyanovaleric acid), ammonium persulfate, and potassium persulfate is preferable. In addition, a conventionally publicly-known polymerization accelerator such as tetramethylethylenediamine and a molecular weight modifier such as alkyl mercaptans including n-dodecyl mercaptan are preferably used in place of or in addition to the polymerization initiator, and the polymerization initiator and the polymerization accelerator are preferably used together, and ammonium persulfate and tetramethylethylenediamine are particularly preferably used together, from the viewpoint that this makes it possible to reduce the polydispersity of the molecular weight of the acrylamide-based polymer obtained and improve the thermal-stabilization yield and the carbonization yield.

The temperature when adding the polymerization initiator is not particularly limited, but is preferably 35° C. or more, more preferably 40° C. or more, further preferably 45° C. or more, particularly preferably 50° C. or more, and most preferably 55° C. or more, from the viewpoint that this makes it possible to reduce the polydispersity of the molecular weight of the acrylamide-based polymer obtained and improve the thermal-stabilization yield and the carbonization yield. In addition, the temperature of the polymerization reaction is not particularly limited, but is preferably 50° C. or more, more preferably 60° C. or more, particularly preferably 70° C. or more, and most preferably 75° C. or more, from the viewpoint that this makes it possible to consume the polymerization initiator rapidly and thus reduce the polydispersity of the molecular weight of the acrylamide-based polymer obtained and improve the thermal-stabilization yield and the carbonization yield. On the other hand, in a conventional common method for producing an acrylamide-based polymer, since the polymerizability of acrylamide is high and the heat removal at the time of polymerization is not easy, the polymerization is carried out at a relatively low temperature and/or with a reduced amount of a polymerization initiator added in order to reduce the polymerization rate. For this reason, the polydispersity of the molecular weight of the acrylamide-based polymer obtained tends to be large.

In addition, when the carbon material precursor of the present invention is produced, a low molecular weight polymer having a weight-average molecular weight of 8,000 or less may be extracted and removed from the acrylamide-based polymer after the polymerization reaction by using a solvent. This makes it possible to reduce the polydispersity of the molecular weight of the acrylamide-based polymer and improve the thermal-stabilization yield and the carbonization yield. The solvent used for the extraction and removal is not particularly limited, but includes, for example, alcohols such as methanol, ethanol, propanol, and isopropanol and organic solvents such as dimethyl sulfoxide and dimethylacetamide. The temperature for the extraction and removal is not particularly limited, but is preferably 30° C. or more, more preferably 40° C. or more, further preferably 50° C. or more, and particularly preferably 60° C. or more, from the viewpoint that a low molecular weight polymer is easily extracted and removed.

[Carbon Material Precursor Composition]

Next, a carbon material precursor composition of the present invention is described. The carbon material precursor composition of the present invention contains the carbon material precursor of the present invention and at least one addition component selected from the group consisting of acids and salts thereof. The thermal-stabilization yield and the carbonization yield are further improved by adding at least one addition component selected from the group consisting of acids and salts thereof to the carbon material precursor of the present invention.

In the carbon material precursor composition of the present invention, the content of such an addition component is preferably 0.1 to 100 parts by mass, more preferably 0.2 to 50 parts by mass, further preferably 0.5 to 30 parts by mass, and particularly preferably 1 to 20 parts by mass, relative to 100 parts by mass of the carbon material precursor, from the viewpoint that the thermal-stabilization yield and the carbonization yield are improved more.

The acids include inorganic acids such as phosphoric acid, polyphosphoric acid, boric acid, polyboric acid, sulfuric acid, nitric acid, carbonic acid, and hydrochloric acid and organic acids such as oxalic acid, citric acid, sulfonic acid, and acetic acid. In addition, the salts of such acids include metal salts (for example, sodium salts and potassium salts), ammonium salts, amine salts, and the like. Ammonium salts and amine salts are preferable, and ammonium salts are more preferable. In particular, among these addition components, phosphoric acid, polyphosphoric acid, boric acid, polyboric acid, and sulfuric acid and ammonium salts of these are preferable, and phosphoric acid and polyphosphoric acid, and ammonium salts of these are particularly preferable, from the viewpoint that the thermal-stabilization yield and the carbonization yield of the carbon material precursor obtained are further improved.

The addition component is preferably soluble in at least one of the aqueous solvent and the water-based mixture solvent (more preferably the aqueous solvent, and particularly preferably water). This makes it possible to perform wet mixing using the aqueous solvent or the water-based mixture solvent when producing the carbon material precursor composition, and thus makes it possible to mix the acrylamide-based polymer and the addition component uniformly and safely at low costs. In addition, this makes it possible to perform dry forming (dry spinning), dry-wet forming (dry-wet spinning), wet forming (wet spinning), or electrospinning using the aqueous solvent or the water-based mixture solvent when forming the carbon material precursor composition obtained, and thus makes it possible to produce a carbon material safely at low costs.

As a method for producing such a carbon material precursor composition of the present invention, it is also possible to employ a method including directly mixing the addition component with the carbon material precursor in a molten state (melt mixing), a method including dry-blending the carbon material precursor and the addition component (dry mixing), and a method including impregnating or passing the carbon material precursor formed in a desired shape (for example, a film shape, a sheet shape, or a fiber shape) into an aqueous solution or a water-based mixed solution that contains the addition component or a solution in which the carbon material precursor has not been completely dissolved but the addition component has been dissolved. In a case where the carbon material precursor and the addition component used are soluble in the aqueous solvent or the water-based mixture solvent, a method including mixing the carbon material precursor and the addition component in the aqueous solvent or the water-based mixture solvent (wet mixing) is preferable from the viewpoint that this method can mix the carbon material precursor and the addition component uniformly. In addition, as the wet mixing, in a case where the above-described polymerization has been performed in the aqueous solvent or in the water-based mixture solvent in producing the carbon material precursor, it is also possible to employ a method including mixing the addition component after the polymerization or the like. Moreover, it is also possible to collect the carbon material precursor composition of the present invention by removing the solvent from the obtained solution, and use the collected carbon material precursor composition in the production of a carbon material described later. Furthermore, it is also possible to use the obtained solution as it is in the production of the carbon material described later without removing the solvent. In addition, in the wet mixing, the aqueous solvent is preferably used, and water is more preferably used, as the solvent from the viewpoint that the carbon material precursor composition can be produced more safely at lower costs. Moreover, the method for removing the solvent is not particularly limited and at least one of publicly-known methods such as distillation under reduced pressure, re-precipitation, hot-air drying, vacuum-drying, and freeze drying may be employed.

[Method for Producing Carbon Material]

Next, a method for producing a carbon material of the present invention is described. As the method for producing a carbon material of the present invention, it is possible to directly carbonize the carbon material precursor of the present invention or the carbon material precursor composition of the present invention. However it is preferable to first perform thermally-stabilizing treatment and subsequently perform carbonizing treatment from the viewpoint that this makes it possible to obtain a carbon material with high yields.

In a preferred method for producing a carbon material of the present invention, a heating treatment is first performed on the carbon material precursor or the carbon material precursor composition of the present invention under an oxidative atmosphere (for example, in the air) (thermally-stabilizing treatment). The carbon material precursor of the present invention is formed of an acrylamide-based polymer having a small content of a low molecular weight polymer, and is unlikely to be thermally decomposed by a thermally-stabilizing treatment. In addition, since the structure of the acrylamide-based polymer constituting the carbon material precursor is converted to a structure having a high heat resistance by the thermally-stabilizing treatment, the carbon material precursor exhibits a high thermal-stabilization yield. Moreover, since the carbon material precursor subjected to the thermally-stabilizing treatment (thermally-stabilized product) has a structure having a high heat resistance, the carbon material precursor exhibits a high carbonization yield. In particular, in the carbon material precursor composition, since deammoniation reaction and dehydration reaction of the acrylamide-based polymer are promoted by catalytic action of the acid or the salt thereof, which is the addition component, a cyclic structure (imide ring structure) is likely to be formed in the molecule and the structure of the acrylamide-based polymer is likely to be converted to a structure having a high heat resistance. As a result, the thermal-stabilization yield of the carbon material precursor and the carbonization yield of the thermally-stabilized product are further increased.

Here, the cyclic structure (imide ring structure) can be confirmed, for example by the presence of the absorption peak derived from the stretching vibration of carbonyl in the imide bond of the imide ring in a range from near 1690 $cm^1$ to near 1800 $cm^1$ by infrared spectroscopy. Note that although the absorption peak derived from the stretching vibration of carbonyl in the acrylamide unit of the acrylamide-based polymer is present near 1680 $cm^1$, this absorption peak decreases or becomes zero due to the formation of the cyclic structure (imide ring structure).

The heating temperature in such a thermally-stabilizing treatment is preferably 500° C. or less, and more preferably 150 to 450° C., and further preferably 200 to 420° C., still further preferably 240 to 410° C., particularly preferably 280 to 400° C., and most preferably 310 to 390° C., from the viewpoint that such a temperature allows the structure to be efficiently converted to a structure having a high heat resistance and increases the total yield of the thermal-stabilization and the carbonization. If the heating temperature in the thermally-stabilizing treatment is more than the upper limit, the generated thermally-stabilized product tends to be thermally decomposed. On the other hand, if the heating temperature in the thermally-stabilizing treatment is less than the lower limit, the deammoniation reaction and the dehydration reaction of the acrylamide-based polymer are not promoted and a cyclic structure (imide ring structure) is unlikely to be formed in the molecule, so that the thermal-stabilization yield of the carbon material precursor and the carbonization yield of the thermally-stabilized product tend to decrease because the heat resistance of the generated thermally-stabilized product is low. In addition, the heating time in the thermally-stabilizing treatment is not particularly limited and heating for a long period of time (for example, over 1 hour) is also possible. However, the heating time is preferably 1 to 60 minutes from the viewpoint of reducing the costs.

Next, the carbon material precursor (thermally-stabilized product) thus subjected to the thermally-stabilizing treatment or the composition containing the carbon material precursor are then subjected to heating treatment (carbonizing treatment) under an inert atmosphere (in an inert gas such as nitrogen, argon, or helium) at a temperature higher than the heating temperature in the thermally-stabilizing treatment. This carbonizes the thermally-stabilized product to obtain a desired carbon material. The heating temperature in such carbonizing treatment is preferably 500° C. or more, and more preferably 1000° C. or more. In addition, the upper limit of the heating temperature is preferably 3000° C. or less, and more preferably 2000° C. or less. Moreover, the heating time in the carbonizing treatment is not particularly limited, but preferably 1 to 60 minutes, and more preferably 1 to 30 minutes. In addition, in the carbonizing treatment, the heating treatment may be performed a plurality of times. For example, it is possible to first perform a heating treatment at a temperature of less than 1000° C., and then perform a heating treatment at a temperature of 1000° C. or more. Note that in the method for producing a carbon material of the present invention, although such a carbonizing treatment may be performed directly on the carbon material precursor or the carbon material precursor composition of the present invention without performing the thermally-stabilizing treatment, it is preferable to first perform the thermally-stabilizing treatment and then perform the carbonizing treatment, from the viewpoint that the total yield of the carbon material are increased. In addition, the "carbonizing treatment" according to the present invention may include "graphitization", which is performed by heating at 2000 to 3000° C. under an inert gas atmosphere in general.

In addition, in the method for producing a carbon material of the present invention, the carbon material precursor or the carbon material precursor composition to be used is preferably formed into a desired shape (for example, a film shape, a sheet shape, or a fiber shape) in advance before the thermally-stabilizing treatment (or before the carbonizing treatment in a case where the thermally-stabilizing treatment has not been performed). At this time, the carbon material precursor or the carbon material precursor composition may be pressure-molded as it is or the carbon material precursor or the carbon material precursor composition in a molten state may be used to be melt molded (for example, by melt casting, melt extrusion molding, injection molding, melt spinning, spun bonding, melt blowing, or centrifugal spinning). However, in a case where the carbon material precursor or the carbon material precursor composition of the present invention is soluble in the aqueous solvent or the water-based mixture solvent, it is preferable that the carbon material precursor or the carbon material precursor composition be first dissolved in the aqueous solvent or the water-based mixture solvent and then an aqueous solution or a water-based mixed solution thus obtained be used to be formed, or that a solution of the carbon material precursor after the above-described polymerization or a solution of the carbon material precursor composition obtained in the above-described wet mixing be formed as it is or after being adjusted to a desired concentration, from the viewpoint that the forming processability is enhanced. As such a forming method, it is preferable to perform solution casting, wet forming, dry spinning, wet spinning, dry-wet spinning, gel spinning, flash spinning, or electrospinning. This makes it possible to produce a carbon material precursor or carbon material precursor composition having a desired shape safely at low costs. In addition, the aqueous solvent is more preferably used, and water is particularly preferably used, as the solvent, from the viewpoint that a carbon material can be produced more safely at lower costs. Using a carbon material precursor or a carbon material precursor composition formed in a desired shape in advance makes it possible to produce a carbon material having a desired shape (for example, a carbon film, a carbon sheet, or a carbon fiber).

Such a method for producing a carbon material of the present invention makes it possible to obtain a carbon material having a high carbon content (preferably, 90% or more in composition ratio measured by an elemental analysis).

EXAMPLES

Hereinafter, the present invention is described in more detail based on Examples and Comparative Examples; however, the present invention is not limited to Examples described below. Note that a method for synthesizing an acrylamide-based polymer used in each Example, a method for preparing a polyacrylamide used in each Comparative Example, and a method for measuring the molecular weights of these are described below.

Synthesis Example 1

First, 12.8 g (0.18 mol) of acrylamide (AAm, manufactured by Wako Pure Chemical Industries, Ltd.) was dissolved in 180 ml of an ion exchanged water, and 1.35 ml (0.009 mol) of tetramethylethylenediamine was added to the obtained aqueous solution, followed by increasing the temperature to 40° C. with stirring under a nitrogen atmosphere. Subsequently, 0.252 g (0.0011 mol) of ammonium persulfate was added thereto, followed by performing polymerization reaction at 60° C. for 3 hours. The obtained aqueous solution was poured into methanol to allow a polymer to precipitate, which was collected and vacuum-dried, obtaining a water-soluble polyacrylamide (PAAm).

Synthesis Example 2

First, 12.8 g (0.18 mol) of acrylamide (AAm, manufactured by Wako Pure Chemical Industries, Ltd.) was dissolved in 180 ml of an ion exchanged water, and 1.35 ml (0.009 mol) of tetramethylethylenediamine was added to the obtained aqueous solution, followed by increasing the temperature to 60° C. with stirring under a nitrogen atmosphere. Subsequently, 0.152 g (0.00067 mol) of ammonium persulfate was added thereto, followed by performing polymerization reaction at 80° C. for 3 hours. The obtained aqueous solution was poured into methanol to allow a polymer to precipitate, which was collected and vacuum-dried, obtaining a water-soluble polyacrylamide (PAAm).

Synthesis Example 3

First, 96.0 g (1.35 mol) of acrylamide (AAm, manufactured by Wako Pure Chemical Industries, Ltd.) and 23.9 g (0.45 mol) of acrylonitrile (AN) were dissolved in 480 ml of an ion exchanged water, and 6.75 ml (0.045 mol) of tetramethylethylenediamine was added to the obtained aqueous solution, followed by increasing the temperature to 50° C. with stirring under a nitrogen atmosphere. Subsequently, 1.52 g (0.0067 mol) of ammonium persulfate was added thereto, followed by performing polymerization reaction at 50° C. for 3 hours. The obtained aqueous solution was poured into methanol to allow a copolymer to precipitate, which was collected and vacuum-dried, obtaining a water-soluble acrylamide/acrylonitrile copolymer (AAm/AN copolymer).

This AAm/AN copolymer was dissolved in heavy water and $^{13}$C-NMR measurement was performed on the obtained aqueous solution under conditions of room temperature and a frequency of 100 MHz. In the obtained $^{13}$C-NMR spectrum, based on the intensity ratio of the peak derived from carbons of the cyano group of acrylonitrile, which was observed from about 121 ppm to about 122 ppm, and the peak derived from carbons of the carbonyl group of acrylamide, which was observed from about 177 ppm to about 182 ppm, a ratio between the acrylamide (AAm) unit and the acrylonitrile (AN) unit in the AAm/AN copolymer was calculated to find AAm/AN=75 mol %/25 mol %.

Synthesis Example 4

First, 96.0 g (1.35 mol) of acrylamide (AAm, manufactured by Wako Pure Chemical Industries, Ltd.) and 23.9 g (0.45 mol) of acrylonitrile (AN) were dissolved into 480 ml of an ion exchanged water, and 6.75 ml (0.045 mol) of tetramethylethylenediamine was added to the obtained aqueous solution, followed by increasing the temperature to 40° C. with stirring under a nitrogen atmosphere. Subsequently, 4.11 g (0.018 mol) of ammonium persulfate was added thereto, followed by performing polymerization reaction at 60° C. for 3 hours. The obtained aqueous solution was poured into methanol to allow a copolymer to precipitate, which was collected and vacuum-dried, obtaining a water-soluble acrylamide/acrylonitrile copolymer (AAm/AN copolymer). The ratio between the acrylamide (AAm) unit and the acrylonitrile (AN) unit in this AAm/AN copolymer was calculated in the same manner as in Synthesis Example 3 to find AAm/AN=75 mol %/25 mol %.

Synthesis Example 5

First, 96.0 g (1.35 mol) of acrylamide (AAm, manufactured by Wako Pure Chemical Industries, Ltd.) and 23.9 g (0.45 mol) of acrylonitrile (AN) were dissolved in 480 ml of an ion exchanged water, and 6.75 ml (0.045 mol) of tetramethylethylenediamine was added to the obtained aqueous solution, followed by increasing the temperature to 45° C. with stirring under a nitrogen atmosphere. Subsequently, 2.52 g (0.011 mol) of ammonium persulfate was added thereto, followed by performing polymerization reaction at 78° C. for 3 hours. The obtained aqueous solution was poured into methanol to allow a copolymer to precipitate, which was collected and vacuum-dried, obtaining a water-soluble acrylamide/acrylonitrile copolymer (AAm/AN copolymer). The ratio between the acrylamide (AAm) unit and the acrylonitrile (AN) unit in this AAm/AN copolymer was calculated in the same manner as in Synthesis Example 3 to find AAm/AN=75 mol %/25 mol %.

Synthesis Example 6

A water-soluble acrylamide/acrylonitrile copolymer (AAm/AN copolymer) was obtained in the same manner as in Synthesis Example 4 except that the amount of ammonium persulfate was changed to 6.17 g (0.027 mol). The ratio between the acrylamide (AAm) unit and the acrylonitrile (AN) unit in this AAm/AN copolymer was calculated in the same manner as in Synthesis Example 3 to find AAm/AN=75 mol %/25 mol %.

Synthesis Example 7

First, 96.0 g (1.35 mol) of acrylamide (AAm, manufactured by Wako Pure Chemical Industries, Ltd.) and 23.9 g (0.45 mol) of acrylonitrile (AN) were dissolved in 480 ml of an ion exchanged water, and 6.75 ml (0.045 mol) of tetramethylethylenediamine was added to the obtained aqueous solution, followed by increasing the temperature to 60° C. with stirring under a nitrogen atmosphere. Subsequently, 2.52 g (0.011 mol) of ammonium persulfate was added thereto, followed by performing polymerization reaction at 78° C. for 3 hours. The obtained aqueous solution was poured into methanol to allow a copolymer to precipitate, which was collected and vacuum-dried, obtaining a water-soluble acrylamide/acrylonitrile copolymer (AAm/AN copolymer). The ratio between the acrylamide (AAm) unit and the acrylonitrile (AN) unit in this AAm/AN copolymer was calculated in the same manner as in Synthesis Example 3 to find AAm/AN=75 mol %/25 mol %.

Synthesis Example 8

First, 96.0 g (1.35 mol) of acrylamide (AAm, manufactured by Wako Pure Chemical Industries, Ltd.) and 23.9 g (0.45 mol) of acrylonitrile (AN) were dissolved in 480 ml of an ion exchanged water, and 6.75 ml (0.045 mol) of tetramethylethylenediamine and 4.11 g (0.018 mol) of ammonium persulfate were added to the obtained aqueous solution, followed by increasing the temperature from room temperature (23° C.) to 60° C. over 10 minutes with stirring under a nitrogen atmosphere, and thereafter performing polymerization reaction at 60° C. for 3 hours. The obtained aqueous solution was poured into methanol to allow a copolymer to precipitate, which was collected and vacuum-dried, obtaining a water-soluble acrylamide/acrylonitrile copolymer (AAm/AN copolymer). The ratio between the acrylamide (AAm) unit and the acrylonitrile (AN) unit in this AAm/AN copolymer was calculated in the same manner as in Synthesis Example 3 to find AAm/AN=75 mol %/25 mol %.

Synthesis Example 9

First, 12.8 g (0.18 mol) of acrylamide (AAm, manufactured by Wako Pure Chemical Industries, Ltd.) was dissolved in 180 ml of an ion exchanged water, and 1.35 ml (0.009 mol) of tetramethylethylenediamine was added to the obtained aqueous solution, followed by increasing the temperature to 30° C. with stirring under a nitrogen atmosphere. Subsequently, 0.252 g (0.0011 mol) of ammonium persulfate was added thereto, followed by increasing the temperature from 30° C. to 50° C. over 10 minutes with stirring, and thereafter performing polymerization reaction at 50° C. for 3 hours. The obtained aqueous solution was poured into methanol to allow a polymer to precipitate, which was collected and vacuum-dried, obtaining a water-soluble polyacrylamide (PAAm).

Synthesis Example 10

First, 96.0 g (1.35 mol) of acrylamide (AAm, manufactured by Wako Pure Chemical Industries, Ltd.) and 23.9 g (0.45 mol) of acrylonitrile (AN) were dissolved in 480 ml of an ion exchanged water, and 3.75 ml (0.025 mol) of tetramethylethylenediamine was added to the obtained aqueous solution, followed by increasing the temperature to 30° C. with stirring under a nitrogen atmosphere. Subsequently, 1.03 g (0.0045 mol) of ammonium persulfate was added thereto, followed by increasing the temperature from 30° C. to 50° C. over 10 minutes with stirring, and thereafter performing polymerization reaction at 50° C. for 3 hours. The obtained aqueous solution was poured into methanol to allow a copolymer to precipitate, which was collected and vacuum-dried, obtaining a water-soluble acrylamide/acrylonitrile copolymer (AAm/AN copolymer). The ratio between the acrylamide (AAm) unit and the acrylonitrile (AN) unit in this AAm/AN copolymer was calculated in the same manner as in Synthesis Example 3 to find AAm/AN=75 mol %/25 mol %.

Comparative Preparation Example 1

The polyacrylamide 10% aqueous solution (Trade No. A0140 manufactured by Tokyo Chemical Industry Co., Ltd.) was vacuum-dried to remove water from the aqueous solution, obtaining a water-soluble polyacrylamide (PAAm).

Comparative Synthesis Example 1

First, 48.0 g (0.675 mol) of acrylamide (AAm, manufactured by Wako Pure Chemical Industries, Ltd.) and 11.95 g (0.225 mol) of acrylonitrile (AN) were dissolved in 1140 ml of an ion exchanged water, and 6.17 g (0.027 mol) of ammonium persulfate was added to the obtained aqueous solution under a nitrogen atmosphere, followed by performing polymerization reaction at 60° C. for 6 hours. The obtained aqueous solution was poured into methanol to allow a copolymer to precipitate, which was collected and vacuum-dried, obtaining a water-soluble acrylamide/acrylonitrile copolymer (AAm/AN copolymer). The ratio between the acrylamide (AAm) unit and the acrylonitrile (AN) unit in this AAm/AN copolymer was calculated in the same manner as in Synthesis Example 3 to find AAm/AN=75 mol %/25 mol %.

<Measurement of Weight-Average Molecular Weight (Mw), Number-Average Molecular Weight (Mn), and Polydispersity of Molecular Weight>

The weight-average molecular weight (Mw) and the number-average molecular weight (Mn) of each of the PAAms obtained in Synthesis Examples 1, 2 and 9 and Comparative Preparation Example 1 and the AAm/ANs obtained in Synthesis Examples 3 to 8 and 10 and Comparative Synthesis Example 1 were measured under the following conditions by using a gel permeation chromatography ("HLC-8220GPC" manufactured by Tosoh corporation), and the polydispersity of the molecular weight (Mw/Mn) was calculated. The results are shown in Table 1.
[Measurement Conditions]
Column: TSKgel GMPW$_{XL}$×2+TSKgel G2500PW$_{XL}$×1
Eluent: 100 mM sodium nitrate aqueous solution/acetonitrile=80/20
Eluent flow rate: 1.0 ml/min
Column temperature: 40° C.
Molecular weight standard: Polyethylene oxide standard/Polyethylene glycol standard
Detector: Refractive index detector

TABLE 1

| | Acrylamide-based polymer | Mw | Mn | Mw/Mn |
|---|---|---|---|---|
| Synth. Ex. 1 | PAAm | 130,000 | 43,000 | 3.0 |
| Synth. Ex. 2 | PAAm | 130,000 | 50,000 | 2.6 |
| Synth. Ex. 3 | AAm/AN = 75/25 | 130,000 | 48,000 | 2.7 |
| Synth. Ex. 4 | AAm/AN = 75/25 | 62,000 | 24,000 | 2.6 |
| Synth. Ex. 5 | AAm/AN = 75/25 | 60,000 | 27,000 | 2.2 |
| Synth. Ex. 6 | AAm/AN = 75/25 | 54,000 | 18,000 | 3.0 |
| Synth. Ex. 7 | AAm/AN = 75/25 | 54,000 | 26,000 | 2.1 |
| Synth. Ex. 8 | AAm/AN = 75/25 | 68,000 | 18,000 | 3.8 |
| Synth. Ex. 9 | PAAm | 500,000 | 109,000 | 4.6 |
| Synth. Ex. 10 | AAm/AN = 75/25 | 520,000 | 116,000 | 4.5 |
| Comp. Prep. Ex. 1 | PAAm | 580,000 | 85,000 | 6.8 |
| Comp. Synth. Ex. 1 | AAm/AN = 75/25 | 140,000 | 24,000 | 5.8 |

In Table 1, as is clear from comparison between Synthesis Example 1 and Synthesis Example 2, between Synthesis Example 4 and Synthesis Example 5, and between Synthesis Example 6 and Synthesis Example 7, it was found that increasing the polymerization temperature makes it possible to obtain an acrylamide-based polymer having a small polydispersity of the molecular weight even when the weight-average molecular weight is comparable. This is assumed to be because increasing the polymerization temperature makes the polymerization rate higher, and hence makes it possible to increase the rate of consumption of monomers and reduce the amount of the polymerization initiator used, and consequently, the generation of low molecular weight polymers caused by the remaining monomers and the polymerization initiator is suppressed in the latter stage of the polymerization reaction.

Example 1

The PAAm (Mw=130,000, Mw/Mn=3.0) obtained in Synthesis Example 1 was used as a carbon material precursor as it was.

Example 2

The PAAm (Mw=130,000, Mw/Mn=3.0) obtained in Synthesis Example 1 was dissolved as a carbon material precursor in an ion exchanged water such that the concentration of the carbon material precursor became 20% by mass. Diammonium hydrogen phosphate was added to the obtained aqueous solution in an amount of 2 parts by mass relative to 100 parts by mass of the carbon material precursor and stirred to be completely dissolved. Water was distilled under reduced pressure from the obtained aqueous solution, and thereafter, the obtained solid component was vacuum-dried to obtain a carbon material precursor composition containing PAAm and diammonium hydrogen phosphate.

Example 3

The PAAm (Mw=130,000, Mw/Mn=2.6) obtained in Synthesis Example 2 was used as a carbon material precursor as it is.

Example 4

A carbon material precursor composition containing PAAm and diammonium hydrogen phosphate was obtained in the same manner as in Example 2 except that the PAAm (Mw=130,000, Mw/Mn=2.6) obtained in Synthesis Example 2 was used as a carbon material precursor.

Example 5

A carbon material precursor composition containing PAAm and phosphoric acid was obtained in the same manner as in Example 4 except that phosphoric acid was added in an amount of 2 parts by mass relative to 100 parts by mass of the carbon material precursor instead of diammonium hydrogen phosphate.

Example 6

The AAm/AN copolymer (AAm/AN=75 mol %/25 mol %, Mw=130,000, Mw/Mn=2.7) obtained in Synthesis Example 3 was used as a carbon material precursor as it is.

Example 7

A carbon material precursor composition containing AAm/AN copolymer and diammonium hydrogen phosphate was obtained in the same manner as in Example 2 except that the AAm/AN copolymer (AAm/AN=75 mol %/25 mol %, Mw=130,000, Mw/Mn=2.7) obtained in Synthesis Example 3 was used as a carbon material precursor.

Example 8

The AAm/AN copolymer (AAm/AN=75 mol %/25 mol %, Mw=62,000, Mw/Mn=2.6) obtained in Synthesis Example 4 was used as a carbon material precursor as it is.

Example 9

A carbon material precursor composition containing AAm/AN copolymer and diammonium hydrogen phosphate was obtained in the same manner as in Example 2 except that the AAm/AN copolymer (AAm/AN=75 mol %/25 mol %, Mw=62,000, Mw/Mn=2.6) obtained in Synthesis Example 4 was used as a carbon material precursor.

Example 10

The AAm/AN copolymer (AAm/AN=75 mol %/25 mol %, Mw=60,000, Mw/Mn=2.2) obtained in Synthesis Example 5 was used as a carbon material precursor as it is.

Example 11

A carbon material precursor composition containing AAm/AN copolymer and diammonium hydrogen phosphate was obtained in the same manner as in Example 2 except that the AAm/AN copolymer (AAm/AN=75 mol %/25 mol %, Mw=60,000, Mw/Mn=2.2) obtained in Synthesis Example 5 was used as a carbon material precursor.

Example 12

A carbon material precursor composition containing AAm/AN copolymer and phosphoric acid was obtained in the same manner as in Example 11 except that phosphoric acid was added in an amount of 2 parts by mass relative to 100 parts by mass of the carbon material precursor instead of diammonium hydrogen phosphate.

Example 13

The AAm/AN copolymer (AAm/AN=75 mol %/25 mol %, Mw=54,000, Mw/Mn=3.0) obtained in Synthesis Example 6 was used as a carbon material precursor as it is.

Example 14

A carbon material precursor composition containing AAm/AN copolymer and diammonium hydrogen phosphate was obtained in the same manner as in Example 2 except that the AAm/AN copolymer (AAm/AN=75 mol %/25 mol %, Mw=54,000, Mw/Mn=3.0) obtained in Synthesis Example 6 was used as a carbon material precursor and the amount of diammonium hydrogen phosphate added was changed to 5 parts by mass relative to 100 parts by mass of the carbon material precursor.

Example 15

The AAm/AN copolymer (AAm/AN=75 mol %/25 mol %, Mw=54,000, Mw/Mn=2.1) obtained in Synthesis Example 7 was used as a carbon material precursor as it is.

Example 16

A carbon material precursor composition containing AAm/AN copolymer and diammonium hydrogen phosphate was obtained in the same manner as in Example 2 except that the AAm/AN copolymer (AAm/AN=75 mol %/25 mol %, Mw=54,000, Mw/Mn=2.1) obtained in Synthesis Example 7 was used as a carbon material precursor.

Example 17

A carbon material precursor composition containing AAm/AN copolymer and diammonium hydrogen phosphate was obtained in the same manner as in Example 16 except that the amount of diammonium hydrogen phosphate added was changed to 5 parts by mass relative to 100 parts by mass of the carbon material precursor.

Example 18

The AAm/AN copolymer (AAm/AN=75 mol %/25 mol %, Mw=68,000, Mw/Mn=3.8) obtained in Synthesis Example 8 was used as a carbon material precursor as it is.

Example 19

A carbon material precursor composition containing AAm/AN copolymer and boric acid was obtained in the same manner as in Example 2 except that the AAm/AN copolymer (AAm/AN=75 mol %/25 mol %, Mw=68,000, Mw/Mn=3.8) obtained in Synthesis Example 8 was used as a carbon material precursor and boric acid was added in an amount of 5 parts by mass relative to 100 parts by mass of the carbon material precursor instead of diammonium hydrogen phosphate.

Example 20

The PAAm (Mw=500,000, Mw/Mn=4.6) obtained in Synthesis Example 9 was used as a carbon material precursor as it is.

Example 21

A carbon material precursor composition containing PAAm and phosphoric acid was obtained in the same manner as in Example 2 except that the PAAm (Mw=500,000, Mw/Mn=4.6) obtained in Synthesis Example 9 was used as a carbon material precursor and phosphoric acid was added in an amount of 2 parts by mass relative to 100 parts by mass of the carbon material precursor instead of diammonium hydrogen phosphate.

Example 22

A carbon material precursor composition containing AAm/AN copolymer and diammonium hydrogen phosphate was obtained in the same manner as in Example 21 except that the amount of diammonium hydrogen phosphate added was changed to 8 parts by mass relative to 100 parts by mass of the carbon material precursor.

Example 23

The AAm/AN copolymer (AAm/AN=75 mol %/25 mol %, Mw=520,000, Mw/Mn=4.5) obtained in Synthesis Example 10 was used as a carbon material precursor as it is.

Comparative Example 1

The PAAm (Mw=580,000, Mw/Mn=6.8) obtained in Comparative Preparation Example 1 was used as a carbon material precursor as it is.

Comparative Example 2

The AAm/AN copolymer (AAm/AN=75 mol %/25 mol %, Mw=140,000, Mw/Mn=5.8) obtained in Comparative Synthesis Example 1 was used as a carbon material precursor as it is.

<Measurement of Thermal-Stabilization Yield>

The carbon material precursor (Examples 1, 3, 6, 8, 10, 13, 15, 18, 20 and 23, and Comparative Examples 1 and 2) or the carbon material precursor composition (Examples 2, 4, 5, 7, 9, 11, 12, 14, 16, 17, 19, 21 and 22) obtained in Examples and Comparative Examples was vacuum-dried at 80° C. for 12 hours, then 3 mg of which was weighed, and heated from room temperature to 350° C. at a temperature increase rate of 10° C./min under an air atmosphere with an air flow rate of 500 ml/min and held at 350° C. for 10 minutes (thermally-stabilizing treatment) by using a differential thermal balance ("TG8120" manufactured by Rigaku Corporation) to obtain a thermally-stabilized product of the carbon material precursor or the carbon material precursor composition. The mass retention rate of the carbon material precursor between before and after the thermally-stabilizing treatment (thermal-stabilization yield of the carbon material precursor) was determined, with the influence of water adsorbed in the carbon material precursor after the vacuum-drying taken into consideration, based on the mass of the carbon material precursor at 150° C., according to the following formula:

Thermal-stabilization yield [%] of carbon material precursor=$M_{350}/M_{150} \times 100$

[$M_{350}$: the mass of the carbon material precursor after being heated at 350° C. for 10 minutes under the air atmosphere (thermally-stabilized product), and $M_{150}$: the mass of the carbon material precursor at 150° C.].

The results are shown in Table 2.

<Measurement of Carbonization Yield>

By using a differential thermal balance ("TG8120" manufactured by Rigaku Corporation), 2 mg of the thermally-stabilized product of the carbon material precursor (Examples 1, 3, 6, 8, 10, 13, 15, 18, 20 and 23, and Comparative Examples 1 and 2) or the thermally-stabilized product of the carbon material precursor composition (Examples 2, 4, 5, 7, 9, 11, 12, 14, 16, 17, 19, 21 and 22) was heated from room temperature to 1100° C. at temperature increase rate of 20° C./min under a nitrogen atmosphere with a nitrogen flow rate of 500 ml/min (carbonizing treatment) to obtain a carbon material. The mass retention rate of the thermally-stabilized product between before and after the carbonizing treatment (the carbonization yield of the thermally-stabilized product at 1100° C.) was determined, with the influence of water adsorbed in the thermally-stabilized product taken into consideration, based on the mass of the thermally-stabilized product at 150° C., according to the following formula:

Carbonization yield [%] of thermally-stabilized product=$M_{1100}/M_{150} \times 100$

[$M_{1100}$: the mass of the thermally-stabilized product after being heated to 1100° C. under the nitrogen atmosphere (carbon material), and $M_{150}$: the mass of the thermally-stabilized product at 150° C.].

The results are shown in Table 2.

<Calculation of Total Yield of Thermal-Stabilization and Carbonization>

The total yield of the thermal-stabilization and the carbonization of the carbon material precursor or the carbon material precursor composition obtained in each of Examples and Comparative Examples was determined according to the following formula:

Total yield [%] of thermal-stabilization and carbonization=(thermal-stabilization yield/100)×(carbonization yield/100)×100.

The results are shown in Table 2.

<Measurement of Carbon Content>

The elemental analysis was performed on the carbon material obtained in each of Examples and showed that every carbon material had a carbon content of 90% or more.

TABLE 2

| | Carbon material precursor | | | Addition component | | Thermal-stabilization yield of carbon material precursor [%] (350° C., 10 min) | Carbonation yield of thermally-stabilized product [%] (1100° C.) | Total yield of thermal-stabilization and carbonization [%] |
|---|---|---|---|---|---|---|---|---|
| | Type of polymer | Mw | Mw/Mn | Type | Added amount*1 | | | |
| Example 1 | PAAm | 130,000 | 3.0 | — | — | 68.0 | 45.6 | 31.0 |
| Example 2 | | | | Diammonium hydrogen phosphate | 2 | 69.5 | 50.5 | 35.1 |
| Example 3 | PAAm | 130,000 | 2.6 | — | — | 70.5 | 51.5 | 36.3 |
| Example 4 | | | | Diammonium hydrogen phosphate | 2 | 72.1 | 54.4 | 39.2 |
| Example 5 | | | | Phosphoric acid | 2 | 72.4 | 54.5 | 39.5 |
| Example 6 | AAm/AN = 75/25 | 130,000 | 2.7 | — | — | 71.7 | 51.8 | 37.1 |
| Example 7 | | | | Diammonium hydrogen phosphate | 2 | 72.7 | 54.4 | 39.5 |
| Example 8 | AAm/AN = 75/25 | 62,000 | 2.6 | — | — | 70.4 | 48.8 | 34.4 |
| Example 9 | | | | Diammonium hydrogen phosphate | 2 | 71.2 | 55.7 | 39.7 |
| Example 10 | AAm/AN = 75/25 | 60,000 | 2.2 | — | — | 72.4 | 50.2 | 36.3 |
| Example 11 | | | | Diammonium hydrogen phosphate | 2 | 72.5 | 57.3 | 41.5 |
| Example 12 | | | | Phosphoric acid | 2 | 72.9 | 57.4 | 41.8 |
| Example 13 | AAm/AN = 75/25 | 54,000 | 3.0 | — | — | 67.8 | 49.5 | 33.6 |
| Example 14 | | | | Diammonium hydrogen phosphate | 5 | 70.7 | 54.4 | 38.5 |
| Example 15 | AAm/AN = 75/25 | 54,000 | 2.1 | — | — | 70.3 | 51.9 | 36.5 |
| Example 16 | | | | Diammonium hydrogen phosphate | 2 | 70.9 | 59.2 | 42.0 |
| Example 17 | | | | Diammonium hydrogen phosphate | 5 | 72.9 | 59.6 | 43.4 |
| Example 18 | AAm/AN = 75/25 | 68,000 | 3.8 | — | — | 65.1 | 43.7 | 28.4 |
| Example 19 | | | | Boric acid | 5 | 72.0 | 58.1 | 41.8 |
| Example 20 | PAAm | 500,000 | 4.6 | — | — | 63.0 | 41.2 | 26.0 |
| Example 21 | | | | Diammonium hydrogen phosphate | 2 | 64.4 | 46.6 | 30.0 |
| Example 22 | | | | Diammonium hydrogen phosphate | 8 | 74.5 | 60.0 | 44.7 |
| Example 23 | AAm/AN = 75/25 | 520,000 | 4.5 | — | — | 63.9 | 41.4 | 26.5 |

TABLE 2-continued

| | Carbon material precursor | | | Addition component | | Thermal-stabilization yield of carbon material precursor [%] (350° C., 10 min) | Carbonation yield of thermally-stabilized product [%] (1100° C.) | Total yield of thermal-stabilization and carbonization [%] |
|---|---|---|---|---|---|---|---|---|
| | Type of polymer | Mw | Mw/Mn | Type | Added amount*1 | | | |
| Comp. Ex. 1 | PAAm | 580,000 | 6.8 | — | — | 60.0 | 34.3 | 20.6 |
| Comp. Ex. 2 | AAm/AN = 75/25 | 140,000 | 5.8 | — | — | 61.9 | 38.9 | 24.1 |

*1The added amount to 100 parts by mass of the carbon material precursor [parts by mass]

As shown in Table 2, as is clear from the comparison between Example 20 and Comparative Example 1 and between Example 6 and Comparative Example 2, it was confirmed that the carbon material precursor of the present invention (Examples 20 and 6), which was formed of an acrylamide-based polymer having a predetermined weight-average molecular weight and having a polydispersity of the molecular weight within a predetermined range had a higher thermal-stabilization yield, a higher carbonization yield of the thermally-stabilized product, and a higher total yield of the thermal-stabilization and the carbonization, as compared with the carbon material precursor (Comparative Examples 1 and 2) formed of an acrylamide-based polymer having a comparable weight-average molecular weight and having a polydispersity of the molecular weight exceeding the predetermined range.

In addition, as is clear from the comparison between Example 6 and Example 3 and between Example 23 and Example 20, it was found that the carbon material precursor (Examples 6 and 23) formed of an acrylamide/acrylonitrile copolymer having a predetermined weight-average molecular weight and having a polydispersity of the molecular weight within a predetermined range had a thermal-stabilization yield, a carbonization yield of the thermally-stabilized product, and a total yield of the thermal-stabilization and the carbonization which were slightly increased as compared with those of the carbon material precursor (Examples 3 and 20) formed of a homopolymer of an acrylamide having a comparable weight-average molecular weight and having a comparable polydispersity of the molecular weight.

Moreover, as is clear from the comparison between Example 1 and Example 3, between Example 8 and Example 10, and between Example 13 and Example 15, it was found that in carbon material precursors formed of the same type of acrylamide-based polymer having a comparable weight-average molecular weight, when the polydispersity of the molecular weight was reduced, the thermal-stabilization yield, the carbonization yield of the thermally-stabilized product and the total yield of the thermal-stabilization and the carbonization were increased.

In addition, as is clear from the comparison between Example 2 and Example 1, between Examples 4 to 5 and Example 3, between Example 7 and Example 6, between Example 9 and Example 8, between Examples 11 to 12 and Example 10, between Example 14 and Example 13, between Examples 16 to 17 and Example 15, between Example 19 and Example 18, and between Examples 21 to 22 and Example 20, it was found that the carbon material precursor composition obtained by adding a predetermined amount of phosphoric acid, boric acid, or phosphate to the carbon material precursor formed of an acrylamide-based polymer having a predetermined weight-average molecular weight and having a polydispersity of the molecular weight within a predetermined range (Examples 2, 4 to 5, 7, 9, 11 to 12, 14, 16 to 17, 19 and 21 to 22) had a thermal-stabilization yield, a carbonization yield of the thermally-stabilized product, and a total yield of the thermal-stabilization and the carbonization which were increased as compared with those in the cases where phosphoric acid or phosphate were not added (Examples 1, 3, 6, 8, 10, 13, 15, 18 and 20).

Moreover, as is clear from the comparison between Example 17 and Example 16 and between Example 22 and Example 21, it was found that when the amount of addition component was increased, the thermal-stabilization yield, the carbonization yield of the thermally-stabilized product, and the total yield of the thermal-stabilization and the carbonization were increased.

[Influence of Thermally-Stabilizing Treatment Temperature]

<Measurement of Thermal-Stabilization Yield>

Each of the carbon material precursor obtained in Example 3, the carbon material precursor composition obtained in Example 17, and the carbon material precursor obtained in Comparative Example 1 was vacuum-dried at 80° C. for 12 hours, then 3 mg of which was weighed, and heated from room temperature to a predetermined temperature at a temperature increase rate of 10° C./min under an air atmosphere with an air flow rate of 500 ml/min and held at the predetermined temperature for a predetermined period of time (thermally-stabilizing treatment) by using a differential thermal balance ("TG8120" manufactured by Rigaku Corporation) to obtain a thermally-stabilized product of the carbon material precursor or the carbon material precursor composition. The mass retention rate of the carbon material precursor between before and after the thermally-stabilizing treatment (the thermal-stabilization yield of the carbon material precursor) was determined, with the influence of water adsorbed in the carbon material precursor after the vacuum-drying taken into consideration, based on the mass of the carbon material precursor at 150° C., according to the following formula:

$$\text{Thermal-stabilization yield [\%] of carbon material precursor} = M_T/M_{150} \times 100$$

[$M_T$: the mass of the carbon material precursor after being heat at the predetermined temperature T [° C.] for the predetermined period of time under the air atmosphere (thermally-stabilized product), and $M_{150}$: the mass of the carbon material precursor at 150° C.].

The results are shown in Table 3.

<Measurement of Carbonization Yield>

By using a differential thermal balance ("TG8120" manufactured by Rigaku Corporation), 2 mg of the thermally-stabilized product of the carbon material precursor (Example 3, and Comparative Example 1) or the thermally-stabilized product of the carbon material precursor composition (Example 17) was heated from room temperature to 1100° C. at a temperature increase rate of 20° C./min under a nitrogen atmosphere with a nitrogen flow rate of 500 ml/min (carbonizing treatment) to obtain a carbon material. The mass retention rate of the thermally-stabilized product between before and after the carbonizing treatment (the carbonization yield of the thermally-stabilized product at 1100° C.) was determined, with the influence of water adsorbed in the thermally-stabilized product taken into consideration, based on the mass of the thermally-stabilized product at 150° C., according to the following formula:

Carbonization yield [%] of thermally-stabilized product=$M_{1100}/M_{150} \times 100$

[$M_{1100}$: the mass of the thermally-stabilized product after being heated to 1100° C. under the nitrogen atmosphere (carbon material), and $M_{150}$: the mass of the thermally-stabilized product at 150° C.).
The results are shown in Table 3.
<Calculation of Total Yield of Thermal-Stabilization and Carbonization>

The total yield of the thermal-stabilization and the carbonization of each of the carbon material precursor obtained in Example 3, the carbon material precursor composition obtained in Example 17, and the carbon material precursor obtained in Comparative Example 1 was determined according to the following formula:

Total yield [%] of thermal-stabilization and carbonization=(thermal-stabilization yield/100)×(carbonization yield/100)×100.

The results are shown in Table 3.

having a predetermined weight-average molecular weight and having a polydispersity of the molecular weight within a predetermined range (Example 3) had a higher thermal-stabilization yield, a higher carbonization yield of the thermally-stabilized product, and a higher total yield of the thermal-stabilization and the carbonization, as compared with the carbon material precursor formed of an acrylamide-based polymer having a polydispersity of the molecular weight exceeding the predetermined range (Comparative Example 1).

As described so far, according to the present invention, it is possible to obtain a carbon material precursor formed of an acrylamide-based polymer and having a high thermal-stabilization yield and a high carbonization yield.

Therefore, since the carbon material precursor used has a high carbonization yield, the method for producing a carbon material of the present invention is useful as a method capable of producing a carbon material efficiently and safely at low costs.

What is claimed is:

1. A thermally-stabilized product comprising a polymer including a cyclic imide ring structure derived by subjecting an acrylamide-based polymer having a weight-average molecular weight of 10,000 to 2,000,000 and a polydispersity of the molecular weight (weight-average molecular weight/number-average molecular weight) of 5.0 or less to a heat thermally-stabilizing treatment.

TABLE 3

| | Carbon material precursor | Addition component | Conditions for thermally-stabilizing treatment | Thermal-stabilization yield of carbon material precursor [%] | Carbonation yield of thermally-stabilized product [%] (1100° C.) | Total yield of thermal-stabilization and carbonization [%] |
|---|---|---|---|---|---|---|
| Ex. 3 | PAAm (Mw = 130,000, Mw/Mn = 2.6) | — | 250° C., 30 min | 84.3 | 39.5 | 33.3 |
| | | | 300° C., 10 min | 79.1 | 44.2 | 35.0 |
| | | | 320° C., 10 min | 72.5 | 49.8 | 36.1 |
| | | | 350° C., 10 min | 70.5 | 51.5 | 36.3 |
| | | | 400° C., 10 min | 61.1 | 56.0 | 34.2 |
| Ex. 17 | AAm/AN = 75/25 (Mw = 54,000, Mw/Mn = 2.1) | Diammonium hydrogen phosphate (5 parts by mass*[1]) | 250° C., 30 min | 83.7 | 48.0 | 40.2 |
| | | | 300° C., 10 min | 78.4 | 53.6 | 42.0 |
| | | | 300° C., 30 min | 76.8 | 55.9 | 42.9 |
| | | | 350° C., 10 min | 72.9 | 59.6 | 43.4 |
| | | | 400° C., 10 min | 65.0 | 63.4 | 41.2 |
| Comp. Ex. 1 | PAAm (Mw = 580,000, Mw/Mn = 6.8) | — | 300° C., 10 min | 76.8 | 25.4 | 19.5 |
| | | | 350° C., 10 min | 60.0 | 34.3 | 20.6 |

*[1]The added amount to 100 parts by mass of the carbon material precursor

As shown in Table 3, it was found that the lower the thermally-stabilizing treatment temperature, the higher the thermal-stabilization yield of the carbon material precursor, and the higher the thermally-stabilizing treatment temperature, the higher the carbonization yield of the thermally-stabilized product; however, there was a preferable range for the thermally-stabilizing treatment temperature from the viewpoint that the total yield of the thermal-stabilization and the carbonization finally obtained became higher.

In addition, as is clear from the comparison between Example 3 and Comparative Example 1, it was confirmed that even when the thermally-stabilizing treatment was performed at 300° C., the carbon material precursor of the present invention formed of an acrylamide-based polymer 2. The thermally-stabilized product according to claim 1, wherein at least one addition component selected from the group consisting of acids and salts thereof is added to the acrylamide-based polymer prior to the heat thermally-stabilizing treatment.

3. A method for producing a carbon material, comprising:
performing a carbonizing treatment on the thermally-stabilized product according to claim 1.

4. A method for producing a carbon material, comprising:
performing a carbonizing treatment on the thermally-stabilized product according to claim 2.

* * * * *